United States Patent
Bibikar et al.

(10) Patent No.: US 9,620,088 B2
(45) Date of Patent: Apr. 11, 2017

(54) TECHNOLOGIES FOR LOW-POWER STANDBY DISPLAY REFRESH

(71) Applicant: Intel Corporation, Santa Clara, CA (US)

(72) Inventors: Vasudev Bibikar, Austin, TX (US); Rajesh Poornachandran, Portland, OR (US); Ajaya V. Durg, Austin, TX (US); Arpit Shah, Austin, TX (US); Anil K. Sabbavarapu, Austin, TX (US); Nabil F. Kerkiz, Austin, TX (US); Quang T. Le, Austin, TX (US); Ryan R. Pinto, Austin, TX (US); Moorthy Rajesh, Folsom, CA (US); James A. Bish, Antelope, CA (US); Ranjani Sridharan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/644,767

(22) Filed: Mar. 11, 2015

(65) Prior Publication Data

US 2016/0267883 A1  Sep. 15, 2016

(51) Int. Cl.
*G09G 5/36* (2006.01)
*G09G 5/395* (2006.01)
*G09G 5/39* (2006.01)

(52) U.S. Cl.
CPC .............. *G09G 5/36* (2013.01); *G09G 5/39* (2013.01); *G09G 5/395* (2013.01); *G09G 2320/103* (2013.01); *G09G 2330/021* (2013.01); *G09G 2360/121* (2013.01); *G09G 2360/125* (2013.01)

(58) Field of Classification Search
CPC ....... G09G 2330/022; G09G 2330/021; G09G 2340/0435; G09G 3/3611; Y02B 60/1228
See application file for complete search history.

(56) References Cited

U.S. PATENT DOCUMENTS

2006/0152460 A1* 7/2006 Toyozawa ............ G09G 3/3648
345/98

* cited by examiner

*Primary Examiner* — Abbas Abdulselam
(74) *Attorney, Agent, or Firm* — Barnes & Thornburg LLP

(57) ABSTRACT

Technologies for low-power display refresh standby include a computing device with a display such as an LCD panel. The computing device may include a system-on-a-chip (SoC) with a processor, I/O subsystem, display controller, and memory. When the computing device determines that a display image is static, the computing device enters a low-power display refresh standby mode, powering down unneeded components of the SoC such as processor cores, peripheral devices, and memory other than a dedicated display buffer. The display controller may access the dedicated display buffer via the I/O subsystem and output the image to the display. The computing device may power down the I/O subsystem and the dedicated display buffer when a display controller FIFO is full of image data, and periodically power on the I/O subsystem and display buffer to fill the display controller FIFO. Other embodiments are described and claimed.

23 Claims, 3 Drawing Sheets

TECHNOLOGIES FOR LOW-POWER STANDBY DISPLAY REFRESH

BACKGROUND

Reducing power consumption is increasingly important for current computing devices, particularly for mobile computing devices and other power-constrained systems. For most devices, graphics processing and display are major power consumers. Typically, a display panel must be constantly refreshed with frame buffer data from the main memory of the device. However, in many common usage scenarios, the device may often display a static image (e.g., while reading, web browsing, word processing, working with email communication, etc.). Certain display panels may reduce power consumption by supporting display self-refresh (DSR). DSR-capable panels include a local memory buffer (e.g., a DRAM buffer) that may retain the last-rendered frame. The DSR-capable panel may display the static image from its internal buffer. Other components of the computing device such as the processor or SoC may power down while the panel is in DSR mode. The panel may resume rendering images from main memory when the displayed image changes. The amount of local memory required by DSR-capable panels tends to increase with increasing display resolution. Thus, larger or higher-resolution displays may require larger amounts of local memory and thus may be increasingly expensive.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
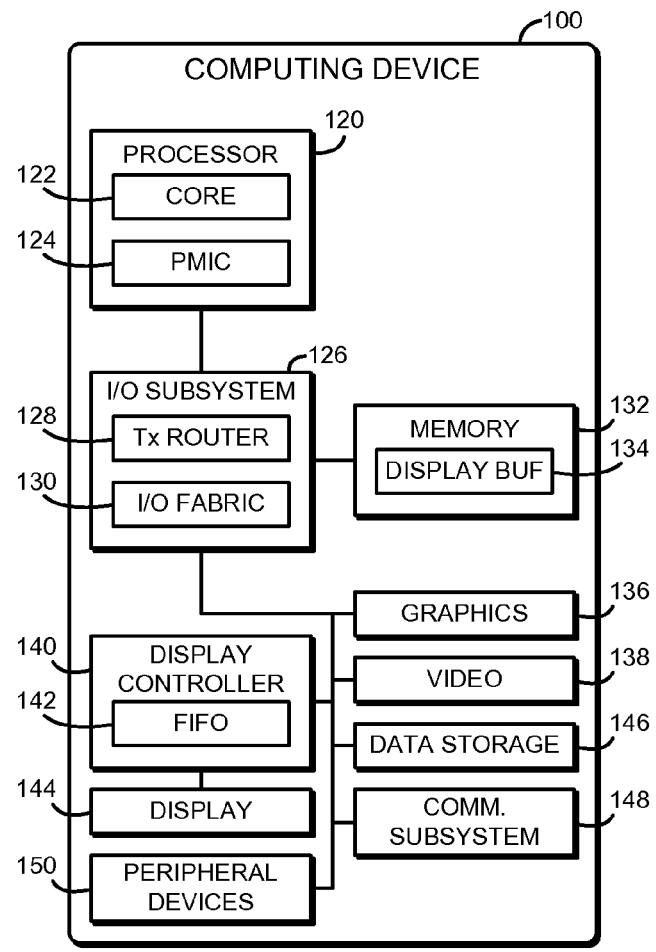
FIG. 1 is a simplified block diagram of at least one embodiment of a computing device for low-power standby display refresh.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for low-power standby display refresh includes a processor 120, an I/O subsystem 126, a memory 132, a data storage device 146, a communications subsystem 148, and a display 144. In use, as described below, the computing device 100 is configured to enter a low-power standby display refresh mode when displaying a static image on the display 144. The computing device 100 may reserve a dedicated portion of the memory 132 for use as a display buffer 134. In the low-power standby display refresh mode, components of the computing device 100 required to retrieve image data from the display buffer 134 and output the image data to the display 144 remain active, and other components of the computing device 100 such as unused memory banks, processor cores, I/O fabrics, and other components may be powered down. In some embodiments, the computing device 100 may power down additional components such as the memory banks including the display buffer 134 and the system agent and then periodically wake those components to access the display buffer 134. Thus, the computing device 100 may support a low-power standby mode capable of displaying a static image on the display 144, without requiring a potentially expensive display self-refresh-capable (DSR-capable) panel with dedicated internal storage. The computing device 100 may achieve about 70-90% of the power savings benefits of using a DSR-capable panel, without the additional added cost. Additionally, the computing device 100 may support always on/always connected usage models with reduced power consumption.

The computing device 100 may be embodied as any type of device capable of low-power standby display refresh and otherwise performing the functions described herein. For example, the computing device 100 may be embodied as, without limitation, a laptop computer, a notebook computer, a tablet computer, a smartphone, a wearable computing device, a computer, a multiprocessor system, a consumer electronic device, a smart appliance, and/or any other computing device capable of low-power standby display refresh. As shown in FIG. 1, the illustrative computing device 100 includes the processor 120, the I/O subsystem 126, the memory 132, and the data storage device 146. Of course, the computing device 100 may include other or additional components, such as components commonly found in a smartphone (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The illustrative processor 120 includes a processor core 122 and a power management integrated circuit (PMIC) 124. The processor core 122 is an independent processing unit capable of executing programmed instructions. Although illustrated as including a single processor core 122, in other embodiments the processor 120 may include multiple processor cores 122. The PMIC 124 may be embodied as any circuit or collection of circuits capable of dynamically managing power delivery to the processor 120 and/or other components of the computing device 100. For example, the PMIC 124 may support power-gating and/or clock-gating components of the processor 120, dynamic voltage and frequency scaling, thermal sensing and management, and other dynamic power management functions. In some embodiments, the processor 120 may include a firmware module or other soft controller capable of programmatically changing the dynamic behavior of power delivery by the PMIC 124. In some embodiments, the power management firmware module may be embodied as a power management unit (PUNIT).

The memory 132 may be embodied as any type of volatile or non-volatile memory or data storage capable of performing the functions described herein. In operation, the memory 132 may store various data and software used during operation of the computing device 100 such operating systems, applications, programs, libraries, and drivers. The memory 132 includes a display buffer 134, which may be embodied as any memory bank, memory rank, or other dedicated memory space used to store image data for use during low-power standby display refresh.

The memory 132 is communicatively coupled to the processor 120 via the I/O subsystem 126, which may be embodied as circuitry and/or components to facilitate input/output operations with the processor 120, the memory 132, and other components of the computing device 100. For example, the I/O subsystem 126 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In particular, the I/O subsystem 126 may include a transaction router 128 and an I/O fabric 130. The transaction router 128 may be embodied as a system agent, system bus, hub, switch, crossbar, or other communication circuit connecting high-bandwidth components of the computing device 100. The transaction router 128 and its connected components may be known as the "north cluster" of the computing device 100. For example, the transaction router 128 may facilitate communications between the processor core 122, the memory 132, a graphics block 136, a video block 138, and a display controller 140, among other components of the computing device 100. The I/O fabric 130 may be embodied as a system bus, hub, switch, or other communication circuit connecting low-bandwidth components of the computing device 100 such as the data storage device 146 and/or other peripheral devices. The I/O fabric 130 and its connected components may be known as the "south cluster" of the computing device 100. In some embodiments, the I/O subsystem 126 may form a portion of a system-on-a-chip (SoC) and be incorporated, along with the processor 120, the memory 132, the display controller 140, and/or other components of the computing device 100 on a single integrated circuit chip. Additionally, the processor 120 and/or the SoC may include one or more IP cores or other functional blocks that may be individually powered on or off (e.g., communications, graphics, storage, I/O devices, or other functional blocks).

The computing device 100 further includes a graphics block 136, a video block 138, a display controller 140, and a display 144. The graphics block 136 may be embodied as any processor graphics, graphics processing unit, or other circuit or collection of circuits capable of rendering two-dimensional and three-dimensional graphics. The video block 138 may be embodied as any accelerated video encoding, accelerated video decoding, or other media processing circuitry. Although illustrated as separate functional blocks, it should be understood that in some embodiments the functionality of the graphics block 136 and/or the video block 138 may be incorporated in one or more other components of the computing device 100, such as the processor 120 and/or the display controller 140.

The display controller 140 may be embodied as any card, controller circuit, IP core, functional block, or other component capable of retrieving image data from the memory 132 and outputting display signals to the display 144. The display controller 140 may include an internal memory buffer 142, for example a first-in-first-out (FIFO) buffer 142, that stores image data for display on the display 144. The display controller 140, along with 2D and 3D graphics rendering components and media processing components, may be integrated with the processor 120 or otherwise form a portion of an SoC. The display 144 of the computing device 100 may be embodied as any type of display capable of displaying digital information such as a liquid crystal display (LCD), a light emitting diode (LED), a plasma display, a cathode ray tube (CRT), or other type of display device. For example, the display 144 may be embodied as a commodity LCD panel that is not capable of display self-refresh (DSR).

The computing device 100 may also include a data storage device 146 and a communications subsystem 148. The data storage device 146 may be embodied as any type of device or devices configured for short-term or long-term storage of data such as, for example, memory devices and circuits, memory cards, hard disk drives, solid-state drives, or other data storage devices. For example, the data storage device 146 may be embodied as one or more eMMC flash memory modules. The communications subsystem 148 may be embodied as any communication circuit, device, or collection thereof, capable of enabling communications between the computing device 100 and other remote devices over a computer network (not shown). The communications subsystem 148 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The computing device 100 may further include one or more peripheral devices 150. The peripheral devices 150 may include any number of additional input/output devices, interface devices, and/or other peripheral devices. For example, in some embodiments, the peripheral devices 150 may include a touch screen, graphics circuitry, an audio device, a microphone, a camera, an environmental sensor, a keyboard, a mouse, and/or other input/output devices, interface devices, and/or peripheral devices.

Figure 2:
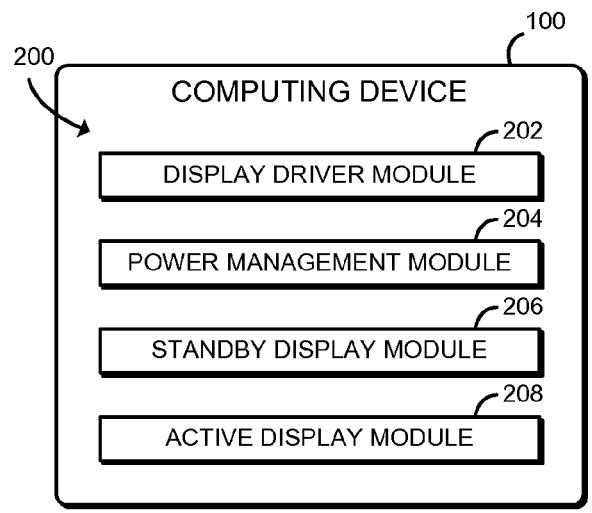
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a display driver module 202, a power management module 204, a standby display module 206, and an active display module 208. The various modules of the environment 200 may be embodied as hardware, firmware, software, or a combination thereof. For example the various modules, logic, and other components of the environment 200 may form a portion of, or otherwise be established by, the processor 120, the I/O subsystem 126, an SoC, or other hardware components of the computing device 100. As such, in some embodiments, any one or more of the modules of the environment 200 may be embodied as a circuit or collection of electrical devices (e.g., a display driver circuit, a power management circuit, etc.).

The display driver module 202 is configured to determine whether a display image stored in a system memory of the computing device 100 is static, that is, whether the display image has not changed for some configurable amount of time. The display driver module 202 may signal other components of the computing device 100, such as the power management module 204, that the display image is static, allowing the computing device 100 to be brought into the display refresh standby mode.

The power management module 204 is configured to enter the low-power display refresh standby mode (i.e., an S0il-DR mode) in response to the display image being static. In the low-power display refresh standby mode, the power management module 204 is configured to power down one or more components of the processor 120, the I/O subsystem 126, and/or a system-on-a-chip (SoC) of the computing device 100, or one or more banks of memory 132. The power management module 204 may power-gate or clock-gate functional blocks or other components, cause memory to enter self-refresh mode, or otherwise reduce the power consumption of the components. The power management module 204 may keep the display controller 140, the transaction router 128, the display buffer 134, and/or any other components required to refresh the display 144 powered on during the display refresh standby mode.

The standby display module 206 is configured to cause the display controller 140 to retrieve image data from the display buffer 134 and output the image data to the display 144 in the display refresh standby mode. In some embodiments, the standby display module 206 may be configured to store the image data in the internal buffer 142 of the display controller 140 and output the image data to the display 144 from the internal buffer 142 of the display controller 140. When outputting the image data from the internal buffer 142 of the display controller 140, the power management module 204 may power down the transaction router 128, the display buffer 134, and/or any other components required for the display controller 140 to access the display buffer 134, further reducing power consumption.

The active display module 208 is configured to cause the display controller 140 to output an image to the display 144 in an active mode, such as an S0 mode. The active display module 208 may cause the display controller 140 to access image data from the memory 132, and that image data may be dynamic or otherwise modified by active components of the computing device 100 such as the processor 120.

Figure 3A:
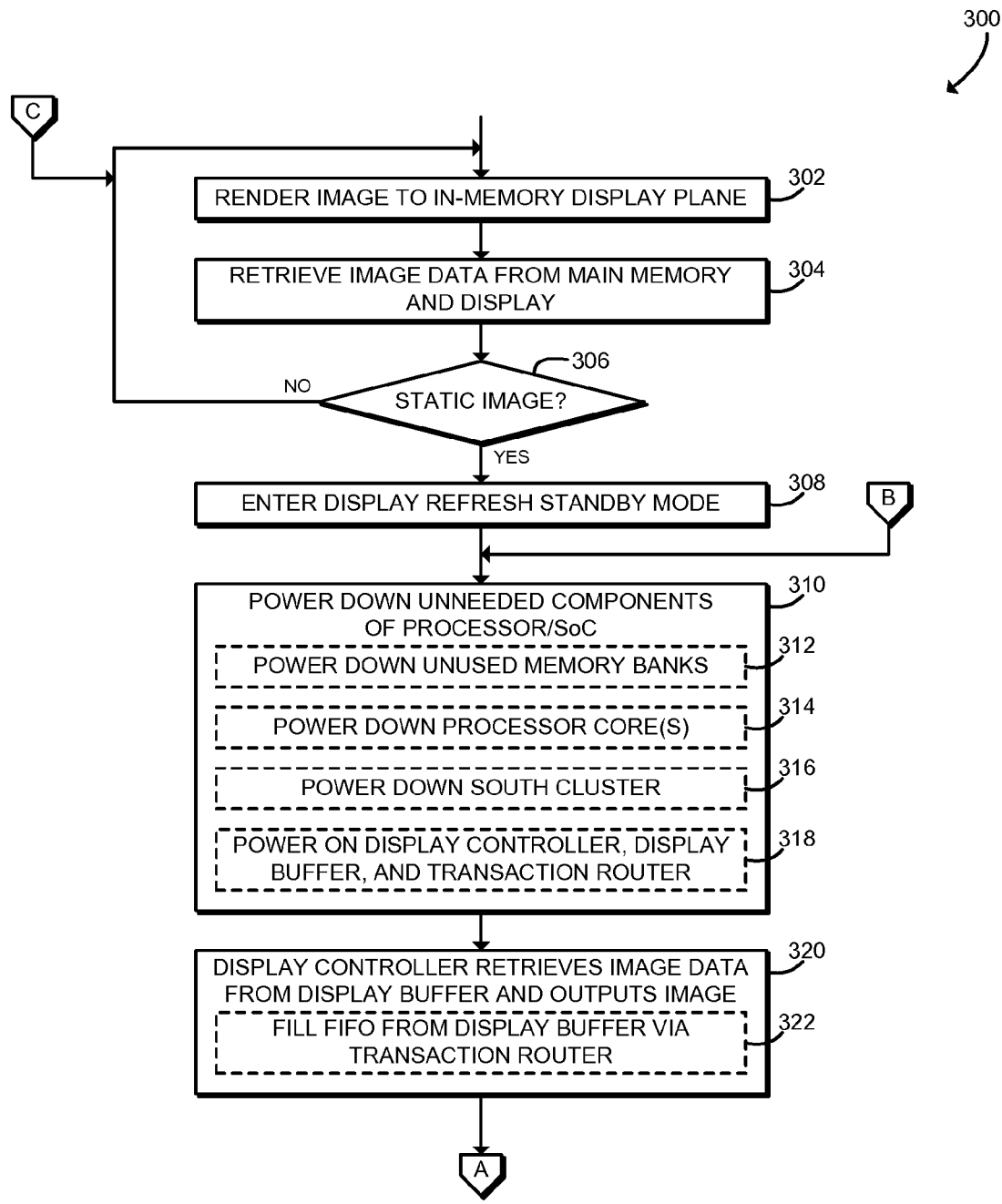
FIGS. 3A and 3B are a simplified flow diagram of at least one embodiment of a method for low-power standby display refresh that may be executed by the computing device of FIGS. 1 and 2.
Figure 3B:
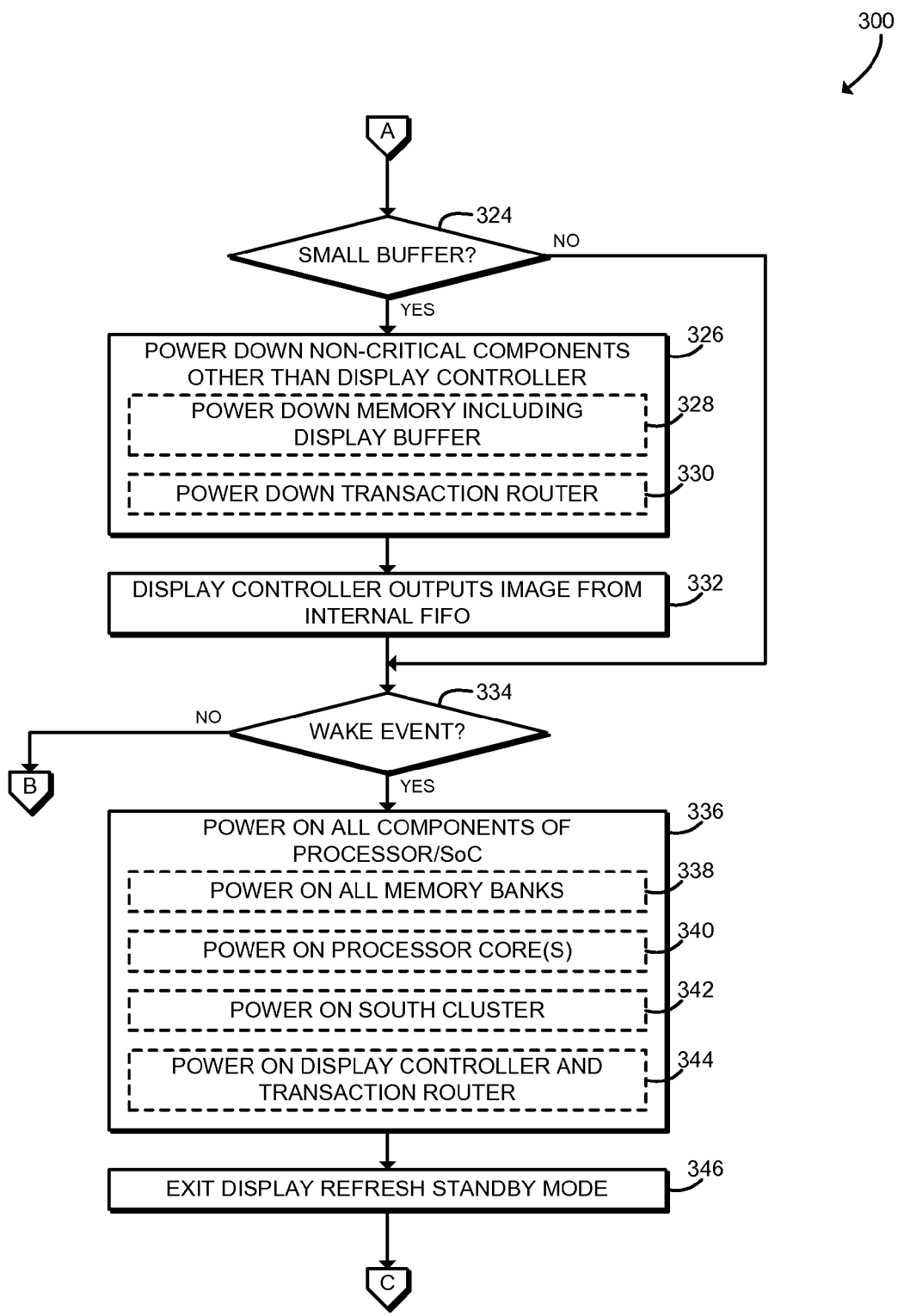

Referring now to FIGS. 3A and 3B, in use, the computing device 100 may execute a method 300 for low-power standby display refresh. The method 300 begins in block 302, in which the computing device 100 renders an image for display to an in-memory display plane. The computing device 100 may operate in a full-power mode such as an S0 active mode. The processor 120 and other components of the computing device 100 may generate the image data by rendering animated graphics, performing calculations, or otherwise operating in a fully operational, active mode. For example, the graphics block 136 and/or the video block 138 may generate two-dimensional or three-dimensional graphics, video overlays, or other image data. The image data may be stored in the display buffer 134 or in other locations in the memory 132. For example, the image data may be stored in one or more display planes, video overlay planes, cursor planes, or other buffers in the memory 132. In block 304, the computing device 100 accesses the image data stored in the memory 132 using the display controller 140 and outputs the image data to the display 144.

In block 306, the computing device 100 determines whether the image data is static. The computing device 100 may, for example, determine whether the contents of buffer in the memory 132 storing the image data have changed over a configurable amount of time. A display driver or other software component of the computing device 100 may determine whether the image data is static. If the image is not static (i.e., if the image data is changing or has changed recently), the method 300 loops back to block 302 to continue rendering image data to the display plane. If the image is static, the method 300 advances to block 308.

In block 308, the computing device 100 enters a low-power display refresh standby mode. The display refresh standby mode may be embodied as a low-power connected standby state in which most components of the SoC are power-gated or clock-gated except for components required to output image data to the display 144 (e.g., the display controller 140, transaction router 128, and display buffer 134). For example, the low-power display refresh standby mode may be referred to as the S0i1-DR mode. The computing device 100 may perform any initialization, setup, or other preparatory routines required to place the computing device 100 in the low-power display refresh standby mode.

In some embodiments, the computing device 100 may prepare the display controller 140 to enter the display refresh standby mode. The display driver and/or other software of the computing device 100 may render the merged image for display as a single display plane. The display driver or other software may configure the display controller 140 to operate in a single-plane, single-pipe mode. For example, the display controller 140 may be enabled for a single Sprite A rendered using Pipe A. In some embodiments, the display driver may program one or more internal FIFO buffer thresholds (watermarks) for the display controller 140. As described below, the internal FIFO buffer thresholds may trigger periodic fetches from the memory 132 during the display refresh standby mode.

The display driver or other software may cause the computing device 100 to enter the display refresh standby mode by writing to a specific control register. For example, the computing device 100 may write to a predefined bit of an S0i1-DR control register. Writing to the control register may signal platform firmware or hardware such as the PUNIT, PMIC 124, and/or the display controller 140 to enter the display refresh standby mode. An operating system power management (OSPM) subsystem or other software of the computing device 100 may instruct the computing device 100 to enter an S0i1 connected standby mode. The PUNIT may interpret the S0i1 mode as the S0i1-DR display refresh standby mode. The operating system and/or other software of the computing device 100 may enter a standby mode such as an S3 suspend-to-RAM mode.

While initiating the display refresh standby mode, the system control unit (SCU) of the computing device 100 may not power-gate the PUNIT or an SoC voltage identifier subsystem of the computing device 100. The SCU may communicate with the PUNIT to start the S0i1-DR mode. The PUNIT may also send signals to prepare the display controller 140 to enter the S0i1-DR mode. For example, the PUNIT may send a max_fifo_mode signal to the display controller 140 to cause the display controller 140 to dedicate its entire internal FIFO buffer 142 to a single display plane or to otherwise prepare the FIFO buffer 142 for the S0i1-DR mode. After receiving the max_fifo_mode signal, the display controller 140 may wait for the next frame start. At the next frame start, the display controller may repartition its internal FIFO buffer 142, assigning the entire internal FIFO buffer 142 (e.g., the entire 48 kB) to Sprite A. At this point, the display controller 140 may be prepared to operate in the S0i1-DR mode.

In block 310, the computing device 100 powers down components of the processor 120, the I/O subsystem 126, and/or the SoC that are not needed for operation in the display refresh standby mode. The computing device 100 may power down components by, for example, power-gating or clock-gating functional blocks of the SoC, placing some or all of the memory 132 into self-refresh, adjusting a power state of the processor 120, or otherwise reducing power consumption of the components. For example, in an illustrative embodiment the computing device 100 may reduce power consumption of the SoC from about 120 mW in the S0 active state to about 90 mW. In some embodiments, in block 312, the computing device 100 may power down unused memory banks of the memory 132. For example, the computing device 100 may put one or more memory banks that do not include the display buffer 134 into a self-refresh mode or other low-power mode. In some embodiments, in block 314 the computing device 100 may power down one or more processor cores 122. In some embodiments, in block 316 the computing device 100 may power down the south cluster of the computing device 100. For example, the computing device 100 may power down the I/O fabric 130 and other components connected to the I/O fabric 130 such as the data storage device 146, the communications subsystem 148, and/or the peripheral devices 150. In block 318, the computing device 100 may power on or otherwise ensure that the display controller 140, the display buffer 134, and the transaction router 128 are active. For example, the computing device 100 may enable one or more clock signals, such as the HPLL signal or the CZ clock, and ensure that the display buffer 134 is out of the self-refresh mode.

In block 320, the display controller 140 retrieves image data from the display buffer 134 and outputs the image for display by the display 144. In some embodiments, in block 322, the display controller 140 may fill its internal FIFO buffer 142 with image data from the display buffer 134 using the transaction router 128. For example, the display controller 140 may issue memory requests to the transaction router 128 (also known as the system agent) with a "zero" deadline. As its internal FIFO 142 is filled, display controller 140 may send a signal to the PUNIT indicating the fill level of the internal FIFO 142. For example, the display controller 140 may indicate that the FIFO 142 is low (e.g., below a low watermark threshold), half-full, or full. The display controller 140 may continue to retrieve image data from the display buffer 134 until the internal FIFO 142 is full.

In block 324, shown in FIG. 3B, the computing device 100 determines whether the display buffer 134 is small in capacity. As described below, if the display buffer 134 is small in capacity, the computing device 100 may periodically fetch image data from the display buffer 134 in the memory 132 when its internal FIFO 142 is empty or low. In some embodiments, the computing device 100 may determine whether the display buffer 134 is small in capacity dynamically. Additionally or alternatively, in some embodiments, the determination of whether the display buffer 134 is small in capacity may be hard-coded or otherwise pre-configured. If the display buffer 134 is not small in capacity, the method 300 branches ahead to block 334, described below. If the display buffer 134 is small in capacity, the method 300 advances to block 326.

In block 326, the computing device 100 powers down non-critical components of the processor 120 and/or the SoC, other than the display controller 140 and any other components required to output an image from the display controller 140 to the display 144. Powering down those components may additionally reduce power consumption of the computing device 100. For example, as described above in connection with block 310, in an illustrative embodiment power consumption of the SoC may be reduced from about 120 mW in the S0 active state to about 90 mW with the transaction router 128 and display buffer 134 active. Continuing that illustrative embodiment, powering down additional components may further reduce power consumption of the SoC from about 90 mW to about 45 mW. In some embodiments, in block 328, the computing device 100 may power down the memory 132, including the memory associated with the display buffer 134. For example, the computing device 100 may place all banks of the memory 132 into a self-refresh mode. In some embodiments, in block 330 the computing device 100 may power down the transaction router 128. The display controller 140 may stop issuing new memory requests to the transaction router 128, and only previously issued memory requests in the queue of the transaction router 128 may be serviced. The transaction router 128 may be power-gated or clock-gated. For example, a clock signal provided to the transaction router 128 and/or to the system bus fabric, such as an HFHPLL signal, may be deactivated. As another example, a system bus clock, such as a CZ clock may also be deactivated.

In block 332, the display controller 140 outputs an image from its internal FIFO buffer 142 to the display 144 for display. The display controller 140 and other critical components of the processor 120 and/or the SoC, such as the PUNIT or PMIC 124, may remain in an active state. For example, a clock signal provided to the display controller 140, such as an LFHPLL signal, may remain active. While outputting the image to the display 144, the display controller 140 may signal the status of its internal FIFO 142 to the PUNIT. For example, the display controller 140 may signal that the FIFO 142 is full, that the FIFO 142 is half-full, or that the FIFO 142 is low (e.g., below a low watermark threshold). The computing device 100 may continue outputting the image by the display controller 140 to the display 144 until the FIFO 142 is below a predetermine threshold (e.g., half full or low). Thus, while operating in the display refresh standby mode, the computing device 100 may alternate between a reduced power consumption state (e.g., using about 90 mW) and an additionally reduced power consumption state (e.g., about 45 mW). The average power consumption of the computing device 100 may be determined based on the duty cycle of those states. In an illustrative embodiment, the computing device 100 may operate about 90% of the time in the additionally reduced power consumption state (with the memory 132 and the transaction router 128 powered down) and about 10% of the time in the reduced power consumption state (retrieving data from the display buffer 134 in the memory 132), providing average power consumption of about 50 mW. That average power consumption may be comparable to the power consumption achievable using a display self-refresh (DSR)-capable display panel.

In block 334, the computing device 100 determines whether a wake event has occurred. Wake events may be embodied as any external wakeup, timer-based wakeup, or other event causing the computing device 100 to return to the full-power, active state. In response to a wake event, the system control unit (SCU) may start one or more clock signals, such as the HPLL signal. The SCU may send a message signaled interrupt (MSI) or other interrupt to the PUNIT to indicate the wake event. If no wakeup event has occurred, the method 300 loops back to block 310, shown in FIG. 3A, to continue retrieving data from the display buffer 134 in the low-power display refresh standby mode. As described above, the computing device 100 may power up components required to access the display buffer 134, such as the transaction router 128 and parts or all of the memory 132. If a wakeup event has occurred, the method 300 advances to block 336. Additionally, although illustrated as checking for a wake event sequentially, it should be understood that wake events may occur asynchronously, e.g., in response to hardware interrupts or timer interrupts.

In block 336, the computing device 100 powers on all components of the processor 120, the I/O subsystem 126, and/or the SoC used for active operation. The computing device 100 may power on components by, for example, removing any power-gating or clock-gating of functional blocks of the SoC, taking the memory 132 out of self-refresh, adjusting a power state of the processor 120, or otherwise allowing full power consumption by the components. In some embodiments, in block 338, the computing device 100 may power on all memory banks of the memory 132, including the display buffer 134. For example, the computing device 100 may take the memory 132 out of a self-refresh mode or other low-power mode. In some embodiments, in block 340 the computing device 100 may power on one or more processor cores 122. In some embodiments, in block 342 the computing device 100 may power on the south cluster of the computing device 100. For example, the computing device 100 may power on the I/O fabric 130 and other components connected to the I/O fabric 130 such as the data storage device 146, the communications subsystem 148, and/or the peripheral devices 150. In block 344 the computing device 100 may power on or otherwise ensure that the display controller 140 and the transaction router 128 are active. For example, the computing device 100 may activate one or more clock signals such as an HPLL signal or the CZ clock.

In block 346, the computing device 100 exits the display refresh standby mode. The computing device 100 may perform any routines required to exit the low-power display refresh standby mode and place the computing device 100 in an active, full-power mode such as the S0 active mode. In some embodiments, the PUNIT may send a signal causing the display controller 140 to exit the S0il-DR mode. For example, the PUNIT may deassert the max_fifo_mode signal to the display controller 140. The display controller 140 may immediately exit the maxfifo mode when the max_fifo_mode signal is deasserted. The display controller 140 may wait for the start of the next frame, and at the next frame start may repartition its internal FIFO buffer 142 based on default driver values.

In some embodiments, the display driver or other software of the computing device 100 may exit the display refresh standby mode by writing to a specific control register. For example, the computing device 100 may write to a predefined bit of the S0il-DR control register. The operating system and/or other software of the computing device 100 may enter an active mode such as the S0 active mode. After exiting the display refresh standby mode, the method 300 loops back to block 302 shown in FIG. 3A to continue rendering and displaying the image data in the full-power, active state.

EXAMPLES

Illustrative examples of the technologies disclosed herein are provided below. An embodiment of the technologies may include any one or more, and any combination of, the examples described below.

Example 1 includes a computing device for low-power display refresh, the computing device comprising a display driver module to determine whether a display image stored in a system memory of the computing device is static; a power management module to (i) enter a low-power display refresh standby mode in response to a determination that the display image is static and (ii) power down one or more components of a processor of the computing device in response to an entrance to the low-power display refresh standby mode; and a standby display module to (i) retrieve, by a display controller of the processor, image data of the display image from a display buffer in the system memory in response to the entrance of the low-power display refresh standby mode and (ii) output, by the display controller, the image data to a display of the computing device.

Example 2 includes the subject matter of Example 1, and wherein to power down the one or more components of the processor comprises to power-gate a component or to clock-gate a component.

Example 3 includes the subject matter of any of Examples 1 and 2, and wherein to power down the one or more components of the processor comprises to cause a memory of the computing device to enter a self-refresh mode.

Example 4 includes the subject matter of any of Examples 1-3, and wherein the one or more components of the processor comprises a processor core.

Example 5 includes the subject matter of any of Examples 1-4, and wherein the one or more components of the processor comprises one or more banks of the system memory, wherein the one or more banks of the system memory do not include the display buffer.

Example 6 includes the subject matter of any of Examples 1-5, and wherein the one or more components of the processor comprises an input/output (I/O) fabric of the processor.

Example 7 includes the subject matter of any of Examples 1-6, and wherein to retrieve the image data from the display buffer in the system memory comprises to access, by the display controller, the display buffer in the system memory via a system-on-a-chip (SoC) transaction router of the processor.

Example 8 includes the subject matter of any of Examples 1-7, and wherein to retrieve the image data from the display buffer in the system memory further comprises to store the image data in an internal buffer of the display controller; and to output the image data to the display comprises to output the image data from the internal buffer of the display controller.

Example 9 includes the subject matter of any of Examples 1-8, and wherein the power management module is further to determine whether the internal buffer of the display controller is full in response to retrieval of the image data; and power down one or more additional components of the processor in response to a determination that the internal buffer of the display controller is full.

Example 10 includes the subject matter of any of Examples 1-9, and wherein the one or more additional components of the processor comprises a bank of the system memory that includes the display buffer.

Example 11 includes the subject matter of any of Examples 1-10, and wherein to retrieve the image data from the display buffer in the system memory comprises to access, by the display controller, the display buffer in the system memory via a system-on-a-chip (SoC) transaction router of the processor; and the one or more additional components of the processor comprises the SoC transaction router.

Example 12 includes the subject matter of any of Examples 1-11, and wherein the power management module is further to determine whether the internal buffer of the display controller is below a predefined threshold level in response to powering down of the one or more additional components of the processor; and power on the one or more additional components of the computing device in response to a determination that the internal buffer of the display controller is below the predefined threshold level; wherein to retrieve the image data from the display buffer in the system memory comprises to retrieve the image data from the display buffer in the system memory in response to the determination that the internal buffer of the display controller is below the predefined threshold level.

Example 13 includes the subject matter of any of Examples 1-12, and wherein the power management module is further to power on the one or more components of a processor of the computing device in response to a wake event; and exit the low-power display refresh standby mode in response to powering on of the one or more components of the processor.

Example 14 includes a method for low-power display refresh, the method comprising determining, by a computing device, whether a display image stored in a system memory of the computing device is static; entering, by the computing device, a low-power display refresh standby mode in response to determining that the display image is static; powering down, by the computing device, one or more components of a processor of the computing device in response to entering the low-power display refresh standby mode; retrieving, by a display controller of the processor of the computing device, image data of the display image from a display buffer in the system memory in response to entering the low-power display refresh standby mode; and outputting, by the display controller, the image data to a display of the computing device.

Example 15 includes the subject matter of Example 14, and wherein powering down the one or more components of the processor comprises power-gating a component or clock-gating a component.

Example 16 includes the subject matter of any of Examples 14 and 15, and wherein powering down the one or more components of the processor comprises causing a memory of the computing device to enter a self-refresh mode.

Example 17 includes the subject matter of any of Examples 14-16, and wherein powering down the one or more components of the processor comprises powering down a processor core.

Example 18 includes the subject matter of any of Examples 14-17, and wherein powering down the one or more components of the processor comprises powering down one or more banks of the system memory, wherein the one or more banks of the system memory do not include the display buffer.

Example 19 includes the subject matter of any of Examples 14-18, and wherein powering down the one or more components of the processor comprises powering down an input/output (I/O) fabric of the processor.

Example 20 includes the subject matter of any of Examples 14-19, and wherein retrieving the image data from the display buffer in the system memory comprises accessing, by the display controller, the display buffer in the system memory via a system-on-a-chip (SoC) transaction router of the processor.

Example 21 includes the subject matter of any of Examples 14-20, and wherein retrieving the image data from the display buffer in the system memory further comprises storing the image data in an internal buffer of the display controller; and outputting the image data to the display comprises outputting the image data from the internal buffer of the display controller.

Example 22 includes the subject matter of any of Examples 14-21, and further including determining, by the computing device, whether the internal buffer of the display controller is full in response to retrieving the image data; and powering down, by the computing device, one or more additional components of the processor in response to determining the internal buffer of the display controller is full.

Example 23 includes the subject matter of any of Examples 14-22, and wherein powering down the one or more additional components of the processor comprises powering down a bank of the system memory that includes the display buffer.

Example 24 includes the subject matter of any of Examples 14-23, and wherein retrieving the image data from the display buffer in the system memory comprises accessing, by the display controller, the display buffer in the system memory via a system-on-a-chip (SoC) transaction router of the processor; and powering down the one or more additional components of the processor comprises powering down the SoC transaction router.

Example 25 includes the subject matter of any of Examples 14-24, and further including determining, by the computing device, whether the internal buffer of the display controller is below a predefined threshold level in response to powering down the one or more additional components of the processor; and powering on, by the computing device, the one or more additional components of the computing device in response to determining that the internal buffer of the display controller is below the predefined threshold level; wherein retrieving the image data from the display buffer in the system memory comprises retrieving the image data from the display buffer in the system memory in response to determining that the internal buffer of the display controller is below the predefined threshold level.

Example 26 includes the subject matter of any of Examples 14-25, and further including powering on, by the computing device, the one or more components of a processor of the computing device in response to a wake event; and exiting, by the computing device, the low-power display refresh standby mode in response to powering on the one or more components of the processor.

Example 27 includes a computing device comprising a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for low-power display refresh, the computing device comprising means for determining whether a display image stored in a system memory of the computing device is static; means for entering a low-power display refresh standby mode in response to determining that the display image is static; means for powering down one or more components of a processor of the computing device in response to entering the low-power display refresh standby mode; means for retrieving, by a display controller of the processor of the computing device, image data of the display image from a display buffer in the system memory in response to entering the low-power display refresh standby mode; and means for outputting, by the display controller, the image data to a display of the computing device.

Example 31 includes the subject matter of Example 30, and wherein the means for powering down the one or more components of the processor comprises means for power-gating a component or clock-gating a component.

Example 32 includes the subject matter of any of Examples 30 and 31, and wherein the means for powering down the one or more components of the processor comprises means for causing a memory of the computing device to enter a self-refresh mode.

Example 33 includes the subject matter of any of Examples 30-32, and wherein the means for powering down the one or more components of the processor comprises means for powering down a processor core.

Example 34 includes the subject matter of any of Examples 30-33, and wherein the means for powering down the one or more components of the processor comprises means for powering down one or more banks of the system memory, wherein the one or more banks of the system memory do not include the display buffer.

Example 35 includes the subject matter of any of Examples 30-34, and wherein the means for powering down the one or more components of the processor comprises means for powering down an input/output (I/O) fabric of the processor.

Example 36 includes the subject matter of any of Examples 30-35, and wherein the means for retrieving the image data from the display buffer in the system memory comprises means for accessing, by the display controller, the display buffer in the system memory via a system-on-a-chip (SoC) transaction router of the processor.

Example 37 includes the subject matter of any of Examples 30-36, and wherein the means for retrieving the image data from the display buffer in the system memory further comprises means for storing the image data in an internal buffer of the display controller; and the means for outputting the image data to the display comprises means for outputting the image data from the internal buffer of the display controller.

Example 38 includes the subject matter of any of Examples 30-37, and further including means for determining whether the internal buffer of the display controller is full in response to retrieving the image data; and means for powering down one or more additional components of the processor in response to determining the internal buffer of the display controller is full.

Example 39 includes the subject matter of any of Examples 30-38, and wherein the means for powering down the one or more additional components of the processor comprises means for powering down a bank of the system memory that includes the display buffer.

Example 40 includes the subject matter of any of Examples 30-39, and wherein the means for retrieving the image data from the display buffer in the system memory comprises means for accessing, by the display controller, the display buffer in the system memory via a system-on-a-chip (SoC) transaction router of the processor; and the means for powering down the one or more additional components of the processor comprises means for powering down the SoC transaction router.

Example 41 includes the subject matter of any of Examples 30-40, and further including means for determining whether the internal buffer of the display controller is below a predefined threshold level in response to powering down the one or more additional components of the processor; and means for powering on the one or more additional components of the computing device in response to determining that the internal buffer of the display controller is below the predefined threshold level; wherein the means for retrieving the image data from the display buffer in the system memory comprises means for retrieving the image data from the display buffer in the system memory in response to determining that the internal buffer of the display controller is below the predefined threshold level.

Example 42 includes the subject matter of any of Examples 30-41, and further including means for powering on the one or more components of a processor of the computing device in response to a wake event; and means for exiting the low-power display refresh standby mode in response to powering on the one or more components of the processor.

The invention claimed is:
1. A computing device for low-power display refresh, the computing device comprising:
a display driver module to determine whether a display image stored in a system memory of the computing device is static; and
a processor including a power management circuit, a power management firmware module, and a display controller;
wherein the power management firmware module is to (i) enter a low-power display refresh standby mode in response to a determination that the display image is static and (ii) power down one or more components of the processor with the power management circuit in response to an entrance to the low-power display refresh standby mode; and wherein the display controller is to (i) retrieve image data of the display image from a display buffer in the system memory in response to the entrance of the low-power display refresh standby mode and (ii) output the image data to a display of the computing device.

2. The computing device of claim 1, wherein the one or more components of the processor comprises a processor core.

3. The computing device of claim 1, wherein the one or more components of the processor comprises one or more banks of the system memory, wherein the one or more banks of the system memory do not include the display buffer.

4. The computing device of claim 1, wherein the one or more components of the processor comprises an input/output (I/O) fabric of the processor.

5. The computing device of claim 1, wherein:
to retrieve the image data from the display buffer in the system memory further comprises to store the image data in an internal buffer of the display controller; and
to output the image data to the display comprises to output the image data from the internal buffer of the display controller.

6. The computing device of claim 5, wherein the power management firmware module is further to:
determine whether the internal buffer of the display controller is full in response to retrieval of the image data; and
power down one or more additional components of the processor with the power management circuit in response to a determination that the internal buffer of the display controller is full.

7. The computing device of claim 6, wherein the one or more additional components of the processor comprises a bank of the system memory that includes the display buffer.

8. The computing device of claim 7, wherein:
to retrieve the image data from the display buffer in the system memory comprises to access, by the display controller, the display buffer in the system memory via a system-on-a-chip (SoC) transaction router of the processor; and
the one or more additional components of the processor comprises the SoC transaction router.

9. The computing device of claim 6, wherein the power management firmware module is further to:
determine whether the internal buffer of the display controller is below a predefined threshold level in response to powering down of the one or more additional components of the processor; and
power on the one or more additional components of the computing device with the power management circuit in response to a determination that the internal buffer of the display controller is below the predefined threshold level;
wherein to retrieve the image data from the display buffer in the system memory comprises to retrieve the image data from the display buffer in the system memory in response to the determination that the internal buffer of the display controller is below the predefined threshold level.

10. A method for low-power display refresh, the method comprising:
determining, by a computing device, whether a display image stored in a system memory of the computing device is static;
entering, by the computing device, a low-power display refresh standby mode in response to determining that the display image is static;
powering down, by the computing device, one or more components of a processor of the computing device in response to entering the low-power display refresh standby mode;
retrieving, by a display controller of the processor of the computing device, image data of the display image from a display buffer in the system memory in response to entering the low-power display refresh standby mode; and
outputting, by the display controller, the image data to a display of the computing device.

11. The method of claim 10, wherein powering down the one or more components of the processor comprises powering down one or more banks of the system memory, wherein the one or more banks of the system memory do not include the display buffer.

12. The method of claim 10, wherein:
retrieving the image data from the display buffer in the system memory further comprises storing the image data in an internal buffer of the display controller; and
outputting the image data to the display comprises outputting the image data from the internal buffer of the display controller.

13. The method of claim 12, further comprising:
determining, by the computing device, whether the internal buffer of the display controller is full in response to retrieving the image data; and
powering down, by the computing device, one or more additional components of the processor in response to determining the internal buffer of the display controller is full.

14. The method of claim 13, wherein powering down the one or more additional components of the processor comprises powering down a bank of the system memory that includes the display buffer.

15. The method of claim 14, wherein:
retrieving the image data from the display buffer in the system memory comprises accessing, by the display controller, the display buffer in the system memory via a system-on-a-chip (SoC) transaction router of the processor; and
powering down the one or more additional components of the processor comprises powering down the SoC transaction router.

16. The method of claim 13, further comprising:
determining, by the computing device, whether the internal buffer of the display controller is below a predefined threshold level in response to powering down the one or more additional components of the processor; and
powering on, by the computing device, the one or more additional components of the computing device in response to determining that the internal buffer of the display controller is below the predefined threshold level;
wherein retrieving the image data from the display buffer in the system memory comprises retrieving the image data from the display buffer in the system memory in response to determining that the internal buffer of the display controller is below the predefined threshold level.

17. One or more non-transitory, computer-readable storage media comprising a plurality of instructions that in response to being executed cause a computing device to:

determine whether a display image stored in a system memory of the computing device is static;

enter a low-power display refresh standby mode in response to determining that the display image is static;

power down one or more components of a processor of the computing device in response to entering the low-power display refresh standby mode;

retrieve, by a display controller of the processor of the computing device, image data of the display image from a display buffer in the system memory in response to entering the low-power display refresh standby mode; and output, by the display controller, the image data to a display of the computing device.

18. The one or more non-transitory, computer-readable storage media of claim 17, wherein to power down the one or more components of the processor comprises to power down one or more banks of the system memory, wherein the one or more banks of the system memory do not include the display buffer.

19. The one or more non-transitory, computer-readable storage media of claim 17, wherein:

to retrieve the image data from the display buffer in the system memory further comprises to store the image data in an internal buffer of the display controller; and to output the image data to the display comprises to output the image data from the internal buffer of the display controller.

20. The one or more non-transitory, computer-readable storage media of claim 19, further comprising a plurality of instructions that in response to being executed cause the computing device to:

determine whether the internal buffer of the display controller is full in response to retrieving the image data; and power down one or more additional components of the processor in response to determining the internal buffer of the display controller is full.

21. The one or more non-transitory, computer-readable storage media of claim 20, wherein to power down the one or more additional components of the processor comprises to power down a bank of the system memory that includes the display buffer.

22. The one or more non-transitory, computer-readable storage media of claim 21, wherein:

to retrieve the image data from the display buffer in the system memory comprises to access, by the display controller, the display buffer in the system memory via a system-on-a-chip (SoC) transaction router of the processor; and to power down the one or more additional components of the processor comprises to power down the SoC transaction router.

23. The one or more non-transitory, computer-readable storage media of claim 20, further comprising a plurality of instructions that in response to being executed cause the computing device to:

determine whether the internal buffer of the display controller is below a predefined threshold level in response to powering down the one or more additional components of the processor; and power on the one or more additional components of the computing device in response to determining that the internal buffer of the display controller is below the predefined threshold level;

wherein to retrieve the image data from the display buffer in the system memory comprises to retrieve the image data from the display buffer in the system memory in response to determining that the internal buffer of the display controller is below the predefined threshold level.

* * * * *